(12) United States Patent
Haas (10) Patent No.: US 6,715,820 B1
(45) Date of Patent: Apr. 6, 2004

(54) TAMPER PROOF COVERS FOR TRANSPORT VESSELS

(75) Inventor: Victor E. Haas, Bowling Green, OH (US)

(73) Assignee: Jones-Hamilton Company, Newark, CA (US)

( * ) Notice: Subject to any disclaimer, the term of this patent is extended or adjusted under 35 U.S.C. 154(b) by 0 days.

(21) Appl. No.: 10/252,292

(22) Filed: Sep. 23, 2002

Related U.S. Application Data (60) Provisional application No. 60/383,950, filed on May 29, 2002.

(51) Int. Cl.$^7$ ................................................ B60J 11/00
(52) U.S. Cl. .................. 296/136.1; 296/1.04; 296/1.05
(58) Field of Search ................................. 296/1.04, 1.05, 296/1.01, 225, 100.15, 100.16, 136.01, 136.07, 136.1; 292/307 R, 325, 307 A; 383/42; 70/50, 440; 24/703.1; 52/DIG. 14

(56) References Cited

U.S. PATENT DOCUMENTS

| | | | | |
|---|---|---|---|---|
| RE31,706 E | * | 10/1984 | De Lima Castro Neto | 292/307 R |
| 4,506,415 A | * | 3/1985 | Swift | 24/16 PB |
| 4,526,416 A | * | 7/1985 | Rode | 296/100.16 |
| 4,592,579 A | * | 6/1986 | Burnett | 292/327 |
| 5,031,943 A | * | 7/1991 | Scott et al. | 292/307 R |
| 5,112,098 A | * | 5/1992 | Lichtmann | 296/136.07 |
| 5,219,194 A | * | 6/1993 | Trent et al. | 292/307 R |
| 5,382,061 A | * | 1/1995 | Swift et al. | 292/311 |
| 5,497,819 A | * | 3/1996 | Chiang | 150/166 |
| 5,746,237 A | * | 5/1998 | Arnic | 135/88.06 |
| 6,096,387 A | * | 8/2000 | Decker | 427/510 |
| 6,141,891 A | * | 11/2000 | Troccola | 37/196 |
| 6,331,022 B1 | * | 12/2001 | Liroff | 292/307 R |
| 6,481,765 B1 | * | 11/2002 | Jelavic | 292/307 R |
| 6,588,812 B1 | * | 7/2003 | Garcia et al. | 292/307 R |
| 2002/0152722 A1 | * | 10/2002 | Stoddard et al. | 53/412 |

* cited by examiner

Primary Examiner—Jason Morrow
(74) Attorney, Agent, or Firm—MacMillan, Sobanski & Todd, LLC (57) ABSTRACT

The invention relates to a method of tamper proofing a transport vessel such as a railroad car, a cargo truck or an ocean container. The transport vessel has a portion, such as an opening or a fitting, with multiple locations at risk of tampering. The portion of the transport vessel is covered with a pliable cover to cover the multiple locations. The cover is then sealed over the portion with a tamper proof seal in a manner effective to prevent removal of the cover, and to prevent access to the locations without tampering with the seal or the cover.

24 Claims, 6 Drawing Sheets

TAMPER PROOF COVERS FOR TRANSPORT VESSELS

CROSS-REFERENCE TO RELATED APPLICATION

This application claims the benefit of U.S. provisional application Ser. No. 60/383,950, filed May 29, 2002.

BACKGROUND OF THE INVENTION

This invention relates in general to transport vessels such as railroad cars, cargo trucks, ocean containers, etc., and in particular to transport vessels having means to prevent tampering with the product carried by the transport vessels.

Transport vessels are often used to carry various products or cargo such as hazardous materials, food grade products, and other materials that are at risk of tampering. Since the terrorist acts of September 11 and the anthrax letters, the prevention of tampering has taken on greater importance. Transport vessels include portions such as openings (e.g., manways, hatches, doors, and/or cutouts) and fittings (e.g., vents, nozzles, pipes, and/or valves). These portions have multiple locations that are at risk of tampering. For example, the bolts used to attach covers over the openings are at risk, as well as the bolts used to attach together the flanges of fittings. The areas between a pair of flanges or between a cover and the tank are also at risk, for example, by insertion of a hypodermic needle therebetween to contaminate the product inside the tank. When it is desired to protect a transport vessel against tampering, the current practice is to individually seal each location of the transport vessel that is at risk of tampering. Unfortunately, the current practice is relatively expensive and time consuming.

SUMMARY OF THE INVENTION

This invention relates to an improved method of tamper proofing a transport vessel such as a railroad car, a cargo truck, or an ocean container. The transport vessel has a portion, such as an opening or a fitting, with multiple locations at risk of tampering. The portion of the transport vessel is covered with a pliable cover to cover the multiple locations. The cover is then sealed over the portion with a tamper proof seal in a manner effective to prevent removal of the cover, and to prevent access to the locations without tampering with the seal or the cover.

The invention also relates to a tamper proof transport vessel. The transport vessel has a portion with multiple locations at risk of tampering. A pliable cover covers the portion of the transport vessel to cover the multiple locations. A tamper proof seal seals the cover over the portion in a manner effective to prevent removal of the cover, and to prevent access to the locations without tampering with the seal or the cover.

Various advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
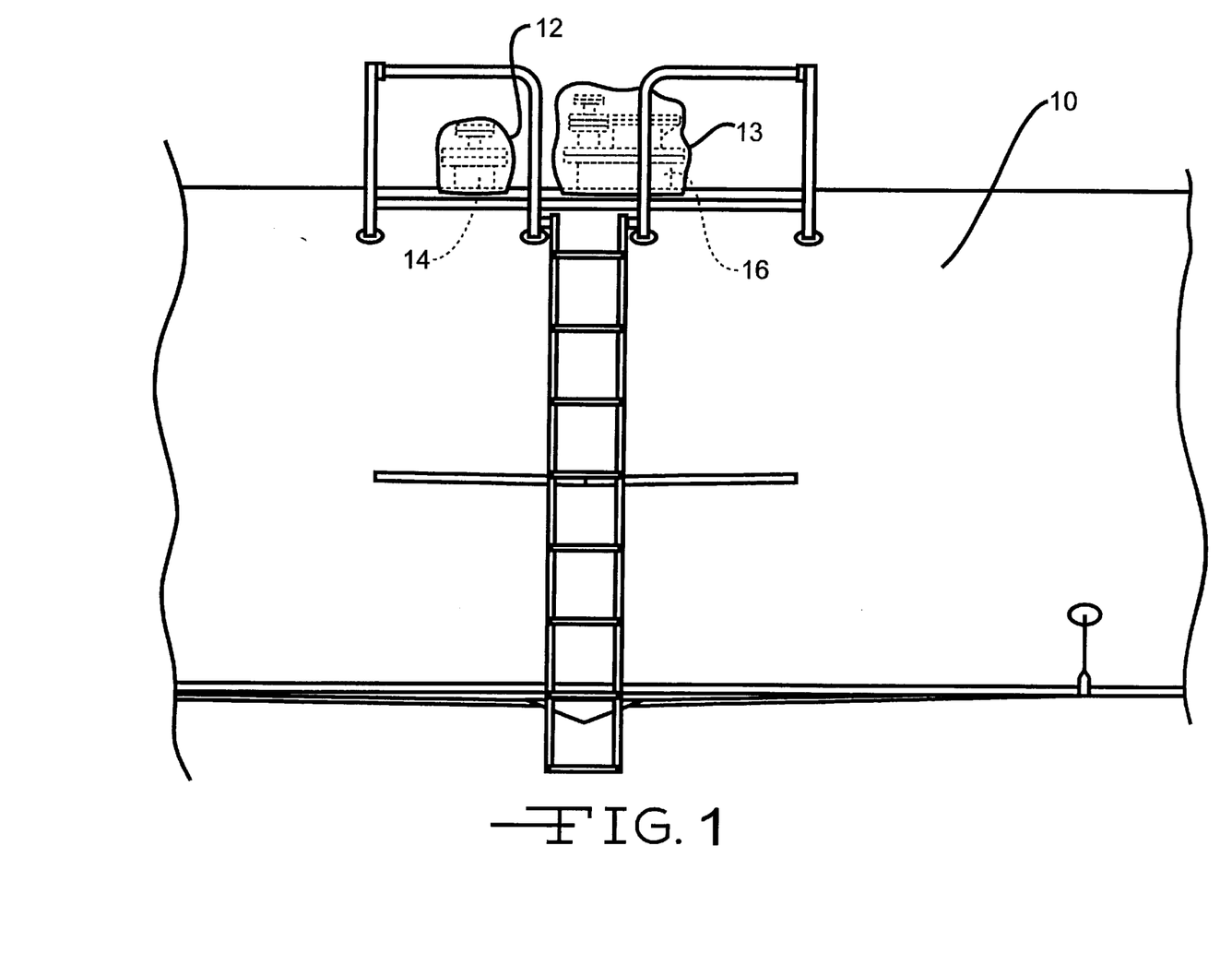
FIG. 1 is a side view of a railroad car having tamper proof covers according to the invention covering a safety vent and a manway positioned on top of the railroad car.

Referring now to the drawings, there is illustrated in FIG. 1 a railroad car 10 having tamper proof covers 12 and 13 according to the invention covering a safety vent 14 and a manway 16 (shown in phantom) positioned on top of the railroad car. The tamper proof cover can be used to prevent tampering on any type of transport vessel, including but not limited to railroad cars, cargo trucks, ocean containers, totes handled by forklift trucks, etc. By "transport vessel" is meant any type of vessel, carrier or container that is used to transport any type of product or cargo, as opposed to passengers.

The product transported by the transport vessel can be any type of product or cargo capable of being transported. In a typical embodiment of the invention, the product is any type of product that may be at risk of tampering. Such products may include, for example, various types of food grade products (e.g., syrups, molasses, processed grains, flours, and feed ingredients) and various types of hazardous materials (e.g., hydrochloric acid, sulfuric acid, and caustic soda).

The transport vessel includes one or more portions or areas having multiple locations that are at risk of tampering. Such portions may include, for example, various openings (e.g., manways, hatches, doors, and/or cutouts), various fittings (e.g., vents, nozzles, pipes, and/or valves), various appendages to the openings or fittings, various fasteners (e.g., bolts and nuts), and various connecting structures (e.g., hinges). In a typical embodiment, the portion is a manway area including all appendages to the manway. The locations that are at risk of tampering may include, for example, hinges, closures that could be removed from covers to gain access to openings, closures that could be removed from fittings connected to the interior of the carrier, and spaces between adjacent structures that could allow access to the interior. As described above, the bolts and nuts used to attach covers over the openings are at risk, as well as the bolts and nuts used to attach the flanges of fittings. The areas between a pair of flanges or between a cover and the tank are also at risk, for example, by insertion of a hypodermic needle or other such device therebetween to contaminate the product inside the tank.

Figure 2:
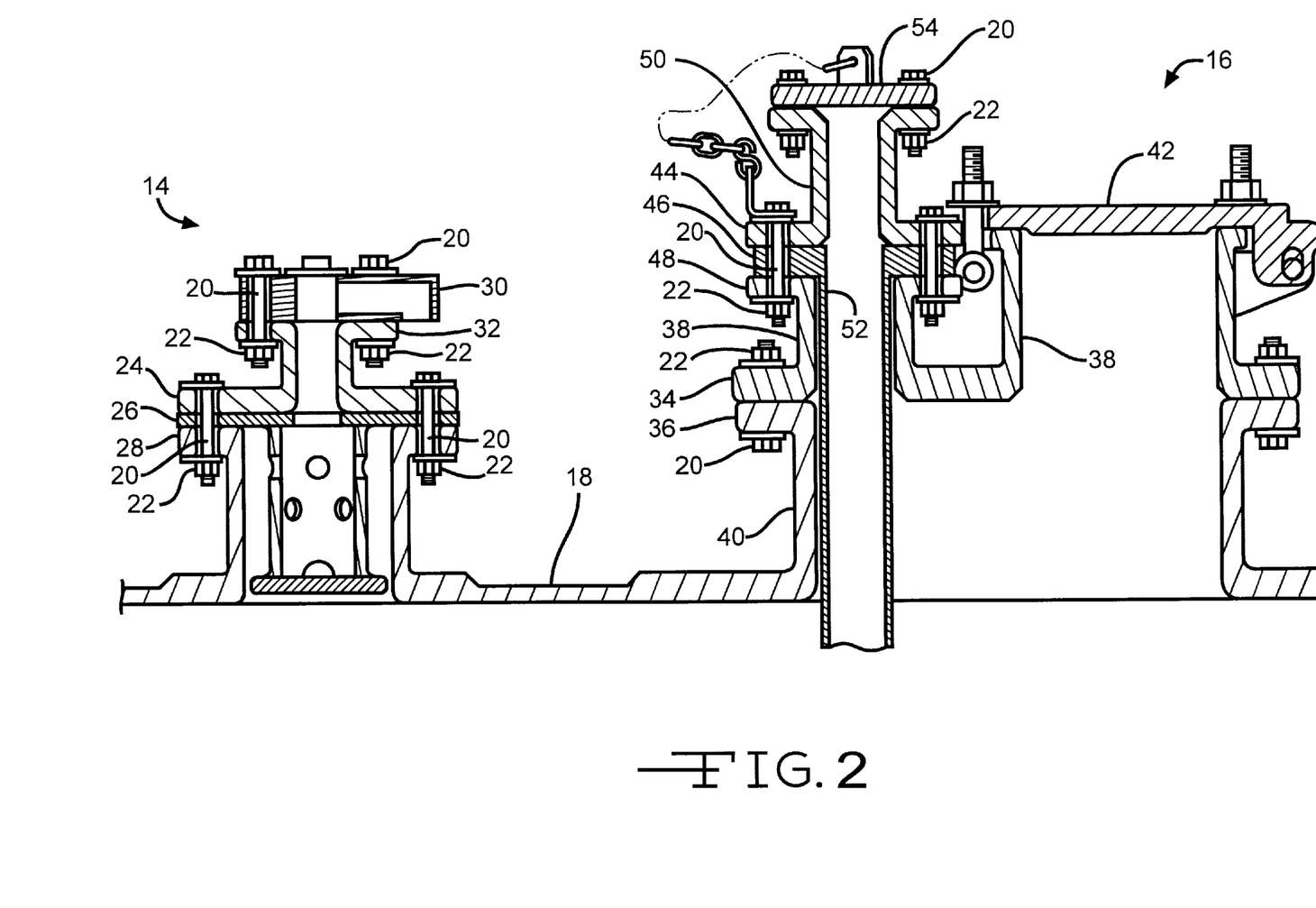
FIG. 2 is a side view in cross-section of the safety vent and the manway, showing multiple locations that are at risk of tampering.
Figure 3:
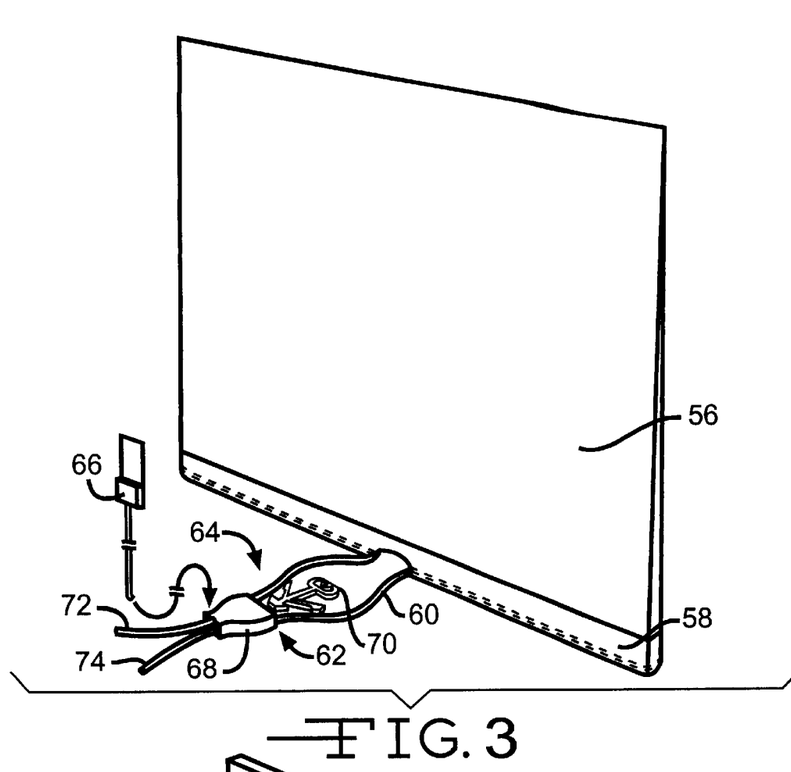
FIGS. 3–5 are perspective views of a first embodiment of a tamper proof cover and tamper proof seal that can be used in the invention.
Figure 4:
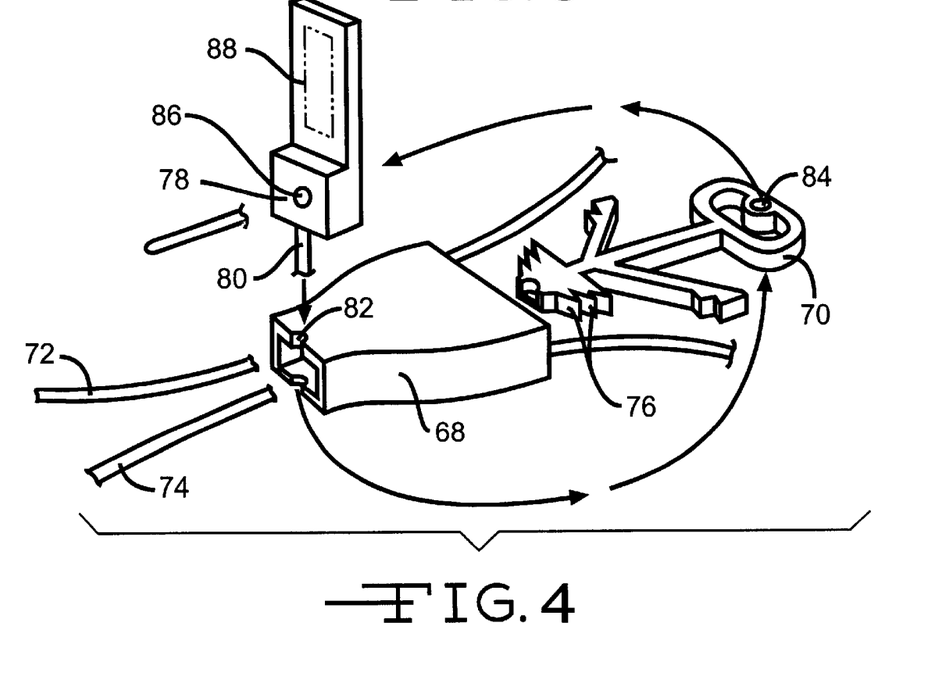
Figure 5:
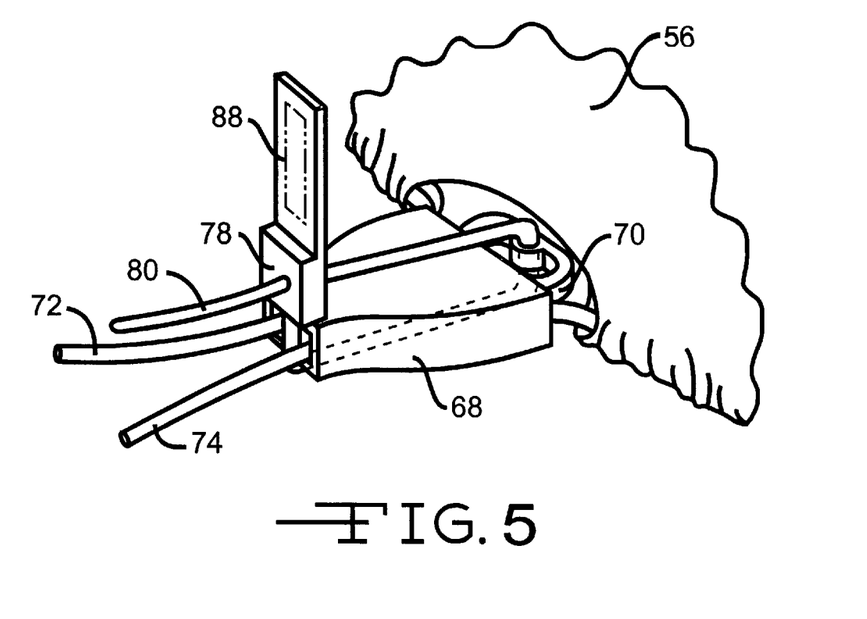

By way of illustration, FIG. 2 shows the safety vent 14 and the manway 16 on the top 18 of the railroad car. Each of these portions of the railroad car has multiple locations that are at risk of tampering. For example, the safety vent 14 has bolts 20 and nuts 22 that attach different flanges 24, 26 and 28 together, and other bolts 20 and nuts 22 that attach a head 30 of the vent to a flange 32. Some of the bolts and nuts could be removed to allow access to the interior of the railroad car through the safety vent. A hypodermic needle could be inserted through the space between two flanges to inject a harmful material into the interior of the railroad car. Similarly, the manway 16 has bolts 20 and nuts 22 that extend through adjacent flanges 34 and 36 to attach the body 38 of the manway to the base 40, other bolts 20 and nuts 22 that attach the cover plate 42 to the body 38, other bolts 20 and nuts 22 that extend through adjacent flanges 44, 46 and 48 to attach the head 50 to the siphon pipe 52 and the body 38, and other bolts 20 and nuts 22 that attach the top plate 54 to the head 50. The different bolts, nuts and flanges are all locations of the railroad car that are at risk of tampering. As described above, the current practice to protect a transport vessel against tampering is to individually seal each location that is at risk of tampering, but this practice is relatively expensive and time consuming.

The present invention provides an improved method of tamper proofing a transport vessel that overcomes the drawbacks of the current practice. The invention involves using a pliable cover to cover the portion of the transport vessel having the locations that are at risk of tampering, rather than individually sealing each of the locations. The portion of the transport vessel, such as the manway 16 or the safety vent 14 described above, is covered with the pliable cover sufficiently to cover substantially all of the multiple locations that are at risk of tampering. Preferably, all of the portions of the transport vessel having locations at risk are covered with one or more pliable covers according to the invention. This is distinguishable from covering the entire transport vessel or the entire top of the transport vessel with a single pliable cover, which would likely be more expensive and less effective in tamper proofing the carrier. The invention involves covering only the portions of the transport vessel having the multiple locations that are at risk of tampering, rather than covering the entire transport vessel. If two or more of the portions are generally adjacent to each other, such as the manway 16 and the safety vent 14 described above, it may be desirable to use a single pliable cover to cover both portions. However, it is usually more effective to cover each of the portions individually with separate pliable covers.

The pliable cover of the invention can have any type of construction and can be made from any type of material that is sufficiently tamper proof, i.e., that will prevent access to the locations on the transport vessel at risk of tampering unless the cover itself is tampered with. If the cover is tampered with, it should be evident by viewing the cover. The term "tamper proof", as used herein, includes tamper resistant, tamper proof, and/or tamper evident. Some examples of materials that may be suitable for making the pliable cover include different types of plastic and cloth, and blends thereof. The cloth can be made from natural and/or synthetic materials. Suitable materials may include different woven and nonwoven materials. Some nonlimiting examples of materials that may be suitable include high strength plastics, heat shrink plastics, polyester cloth, and various tarp materials such as canvas. Some preferred types of plastic for use in the invention are high strength plastic films sold under the name VALERON® by Valeron Strength Films, Houston, Tex. The material can be relatively thick or thin depending on the particular material and use. In some embodiments, the material is re-usable, disposable, and/or has a limited life. The pliable cover is in contrast to a hard solid cover such as a metal structure permanently attached as a cover to the transport vessel. The pliable cover can be any size and shape suitable for covering the portion of the transport vessel and being sealed to prevent tampering. The cover is usually in the form of a bag having an open end that can be drawn tight around the base of the portion of the transport vessel and sealed.

Figure 9:
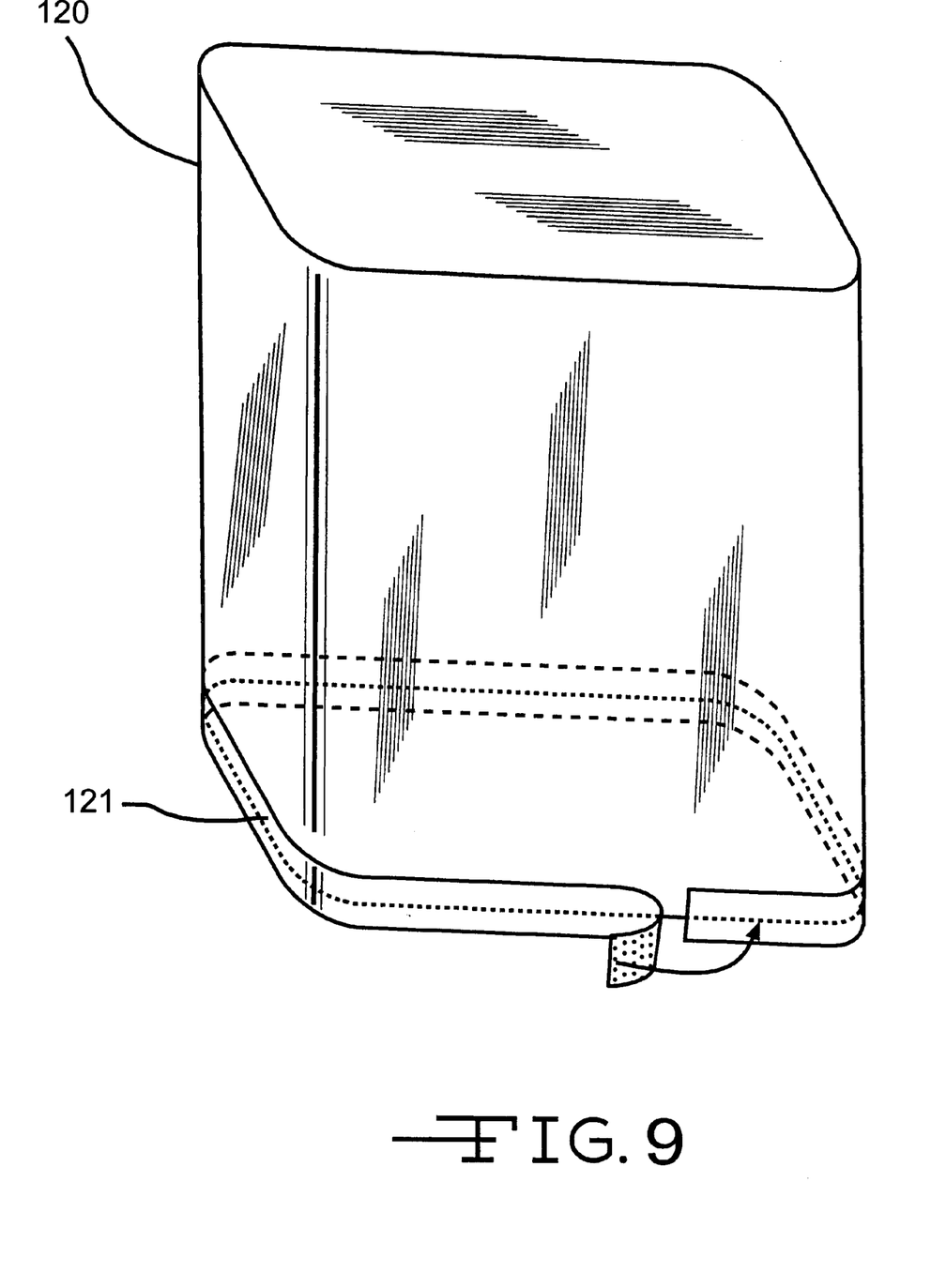
FIG. 9 is a perspective view of a fourth embodiment of a tamper proof cover and a tamper proof seal that can be used in the invention.

After the pliable cover is positioned over the portion of the transport vessel having the multiple locations at risk of tampering, the cover is sealed with a tamper proof seal. The sealing of the cover should be effective to prevent removal of the cover and to prevent access to the locations without tampering with the seal or the cover. Preferably, the portion to be protected is substantially encapsulated by the sealed cover. Many different types of seal can be used in the invention. In some embodiments, the seal is part of the cover, i.e., it is attached to the cover or it is formed integrally with the cover. In some embodiments, a strap, cord, chain or drawstring is attached to a tamper proof locking device, or to a locking device that can be sealed to make it tamper proof. The seal may also include a tape attached to the cover, where the tape cannot be removed from the cover without destroying the cover and/or the tape. FIG. 9 illustrates a tamper proof cover 120 having a tamper proof seal in the form of a tape 121 that cannot be removed from the cover without destroying the cover and/or the tape.

Preferably, the tamper proof seal is marked with a unique identification number to further ensure against tampering with the seal (e.g., destroying the seal and replacing it with another similar seal after tampering with the product). For example, the seal can be marked with a unique number from a specific manufacturer. The number can be included on the bill of lading sent by the manufacturer to the customer, and the customer can compare the number on the seal with the number on the bill of lading to check that the seal hasn't been tampered with.

Some nonlimiting examples of different tamper proof seals that can be used with tamper proof covers in the invention are illustrated in FIGS. 3–8. In a first embodiment, shown in FIGS. 3–5, a tamper proof cover 56 has a sleeve casing 58 around the open end of the cover. A drawstring 60 is inserted through the sleeve casing. The drawstring can be made from any suitable material, such as a high strength plastic, cord, rope, string, etc. The drawstring can be drawn up tightly around the portion of the transport vessel and sealed with a tamper proof seal, indicated generally at 62. In the embodiment shown, the seal includes a ring pull cord cincher, indicated generally at 64, and a lockable pull strap 66. The ring pull cord cincher 64 includes an outside housing 68 and a center-piece ring 70. The outside housing and the center-piece ring can be made from any suitable material, such as polypropylene or other high strength plastic. The ends 72 and 74 of the drawstring 60 are inserted through the outer housing 68, and then the center-piece ring 70 is inserted into the outer housing to lock the drawstring and thereby prevent it from being loosened. The center-piece ring 70 has teeth 76 that cooperate with teeth (not shown) inside the outer housing 68, so that the center-piece ring can be inserted into the outer housing but not removed. To further ensure against tampering, the lockable pull strap 66 is used along with the ring pull cord cincher 64. The lockable pull strap 66 includes a body 78 and a strap 80. The lockable pull strap can be made from any suitable material, such as polypropylene or other high strength plastic. The strap 80 is inserted through a notch 82 in the outer housing 68, through a hole 84 in the top of the center-piece ring 70, then through a hole 86 in the body 78 of the lockable pull strap 66. The strap 80 is then drawn tight. The hole 86 in the body 78 of the lockable pull strap 66 has teeth (not shown) that engage the strap 80 or other means so that the pull strap can be tightened but not loosened. The body 78 of the lockable pull strap 66 includes a tab 88 having a unique identification number (not shown). A lockable pull strap 66 such as described above can be purchased from E. J. Brooks or other manufacturers. E. J. Brooks and other companies also manufacture a ring pull cord cincher 64 or similar devices.

Figure 6:
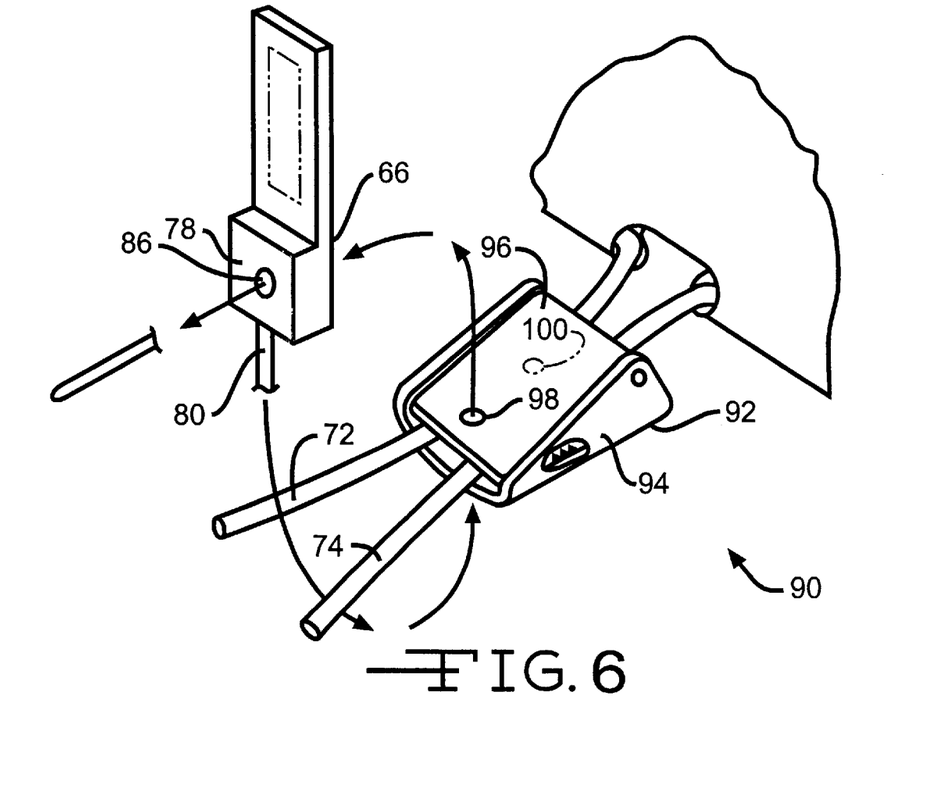
FIGS. 6 and 7 are perspective views of a second embodiment of a tamper proof seal that can be used with a tamper proof cover in the invention.
Figure 7:
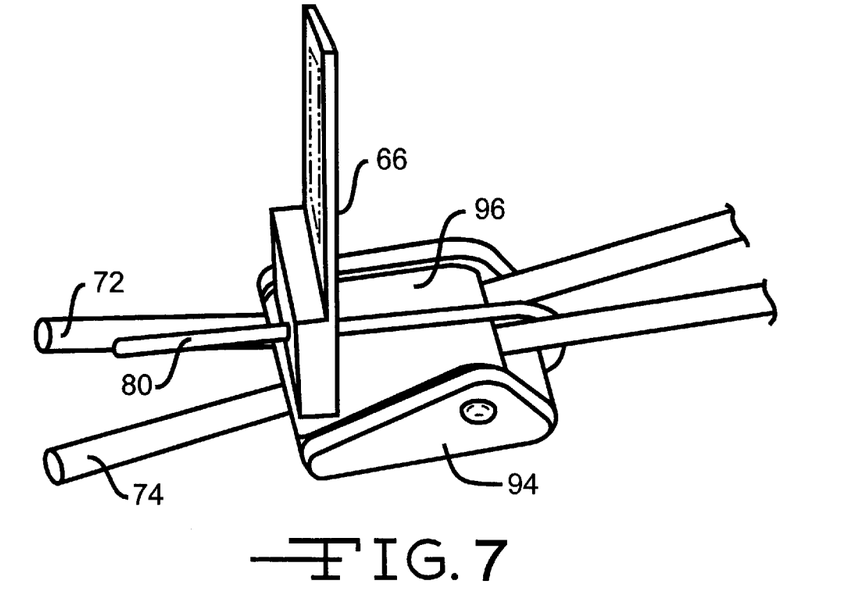

In a second embodiment, shown in FIGS. 6 and 7, the tamper proof seal 90 includes a camming buckle 92 and a lockable pull strap 66. The camming buckle 92 includes a body 94 and a clamp 96. The camming buckle can be made from any suitable material, such as polypropylene, acetal or other high strength plastic. The ends 72 and 74 of the drawstring are inserted through the body 94 and the clamp 96 is closed to lock drawstring in place by a positive jamming action. The strap 80 of the lockable pull strap 66 is inserted through a hole (not shown) in the body 94, a corresponding hole 98 in the clamp 96, then through the hole 86 in the body 78 of the lockable pull strap. The strap 80 is then drawn tight. Alternatively, the clamp 96 can include a second hole 100 (shown in phantom) and the body 94 can include a corresponding second hole (not shown), and the strap 80 of the lockable pull strap 66 can be looped through the four holes and drawn tight. A camming buckle 92 such as described or similar devices can be purchased from National Molding and other manufacturers.

Figure 8:
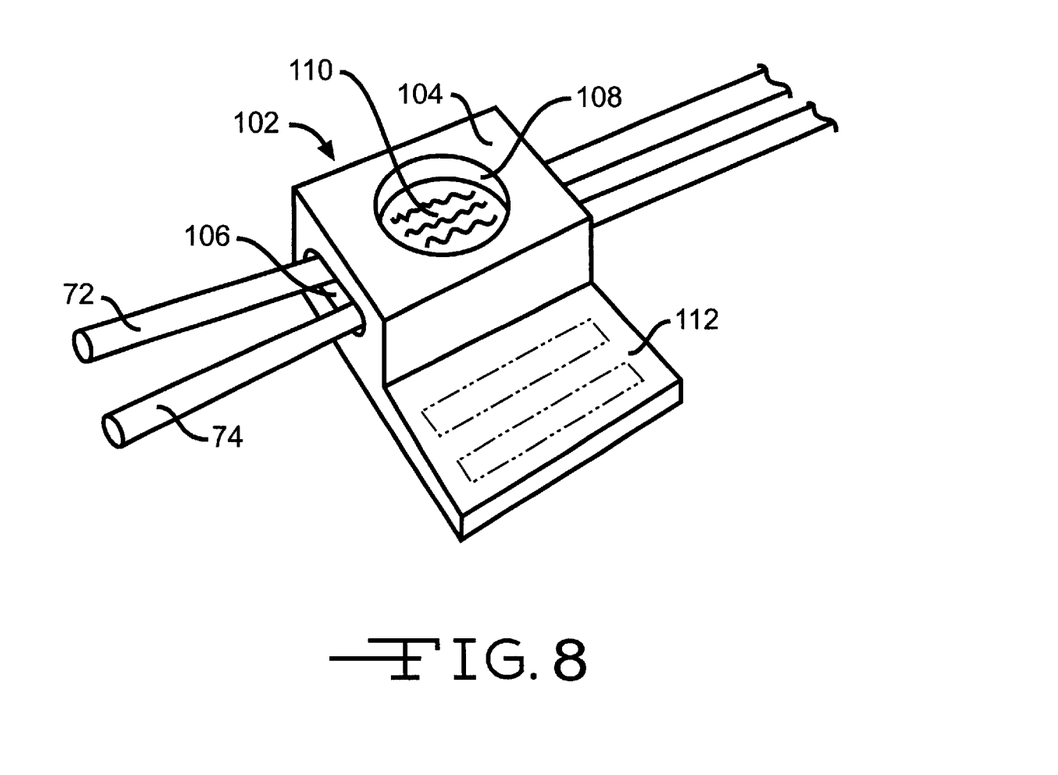
FIG. 8 is a perspective view of a third embodiment of a tamper proof seal that can be used with a tamper proof cover in the invention.

In a third embodiment, shown in FIG. 8, the tamper proof seal 102 has a body 104 and a passage 106 through the body for insertion of the ends 72 and 74 of the drawstring. An opening 108 is formed in the top of the body 104 intersecting with the passage 106. A crushable material 110 is inserted through the opening 108 and crushed inward against the ends 72 and 74 of the drawstring to lock the drawstring in place. Alternatively, a meltable material (not shown) could be inserted into the opening and melted then solidified to lock the drawstring in place. The body 104 has a tab 112 for including a unique indentification number (not shown). Many other different types of tamper proof seals can be used in the invention.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A method of tamper proofing a transport vessel that is used to transport product as opposed to passengers, the transport vessel having a portion with multiple locations at risk of tampering, comprising the steps of:
    with a pliable cover, covering only the portion of the transport vessel to cover the multiple locations, and not covering the entire transport vessel or the entire top of the transport vessel with the cover; and
    sealing the cover over the portion with a tamper proof seal in a manner effective to prevent removal of the cover and to prevent access to the locations without destroying the seal or the cover.

2. A method according to claim 1 wherein the seal is part of the cover.

3. A method according to claim 1 wherein the cover is made from plastic or cloth.

4. A method according to claim 1 wherein the seal includes a tamper proof locking device.

5. A method according to claim 1 wherein the seal includes a draw string to draw the cover tightly against the portion of the transport vessel.

6. A method according to claim 1 wherein the seal includes a tape attached to the cover, and wherein the tape cannot be removed from the cover without destroying the cover or the tape.

7. A method according to claim 1 wherein the seal includes a cord or a strap attached to a locking device that can be sealed to prevent it from being opened.

8. A method according to claim 1 wherein the transport vessel is a railroad car, a cargo truck, or an ocean container.

9. A method according to claim 1 wherein the portion of the transport vessel is an opening or a fitting.

10. A tamper proof transport vessel comprising:
    a transport vessel that is used to transport product as opposed to passengers, the transport vessel having a portion with multiple locations at risk of tampering;
    a pliable cover covering only the portion of the transport vessel to cover the multiple locations, and not covering the entire transport vessel or the entire top of the transport vessel; and
    a tamper proof seal sealing the cover over the portion in a manner effective to prevent removal of the cover and to prevent access to the locations without destroying the seal or the cover.

11. A transport vessel according to claim 10 wherein the seal is part of the cover.

12. A transport vessel according to claim 10 wherein the cover is made from plastic or cloth.

13. A transport vessel according to claim 10 wherein the seal includes a tamper proof locking device.

14. A transport vessel according to claim 10 wherein the seal includes a draw string to draw the cover tightly against the portion of the transport vessel.

15. A transport vessel according to claim 10 wherein the seal includes a tape attached to the cover, and wherein the tape cannot be removed from the cover without destroying the cover or the tape.

16. A transport vessel according to claim 10 wherein the seal includes a cord or a strap attached to a locking device that can be sealed to prevent it from being opened.

17. A transport vessel according to claim 10 wherein the transport vessel is a railroad car, a cargo truck or an ocean container.

18. A transport vessel according to claim 10 wherein the portion of the transport vessel is an opening or a fitting.

19. A method according to claim 1 wherein the seal includes a draw string to draw the cover tightly against the portion of the transport vessel, and a locking device through which the ends of the draw string extend, the ends of the drawstring being locked in place by the locking device.

20. A method according to claim 19 wherein the seal additionally includes a lockable pull strap, the pull strap including an identification tag marked with a unique identification number, the pull strap further including a strap portion that extends from the tag through an opening in the locking device and then through an opening in the tag, wherein the strap portion is locked in the tag opening such that the locking device cannot be opened without destroying the pull strap or the locking device.

21. A method according to claim 10 wherein the seal includes a draw string to draw the cover tightly against the portion of the transport vessel, and a locking device through which the ends of the draw string extend, the ends of the drawstring being locked in place by the locking device.

22. A method according to claim 21 wherein the seal additionally includes a lockable pull strap, the pull strap including an identification tag marked with a unique identification number, the pull strap further including a strap portion that extends from the tag through an opening in the locking device and then through an opening in the tag, wherein the strap portion is locked in the tag opening such that the locking device cannot be opened without destroying the pull strap or the locking device.

23. A method of tamper proofing a transport vessel comprising a railroad car, a cargo truck or an ocean container, the transport vessel being used to transport product as opposed to passengers, the transport vessel having a portion with multiple locations at risk of tampering, comprising the steps of:

with a pliable cover, covering only the portion of the transport vessel to cover the multiple locations, and not covering the entire transport vessel or the entire top of the transport vessel with the cover;

marking a tamper proof seal with a unique identification number; and sealing the cover over the portion with the tamper proof seal in a manner effective to prevent removal of the cover and to prevent access to the locations without destroying the seal or the cover.

24. A method of tamper proofing a transport vessel that is used to transport product as opposed to passengers, the transport vessel having a portion with multiple locations at risk of tampering, comprising the steps of:

with a pliable cover, covering only the portion of the transport vessel to cover the multiple locations, and not covering the entire transport vessel or the entire top of the transport vessel with the cover; and sealing the cover over the portion with a tamper proof seal in a manner effective to prevent removal of the cover and to prevent access to the locations without destroying the seal or the cover;

marking the seal with a unique identification number; and including the identification number on a bill of lading sent to the customer of the product.

* * * * *